US008665134B2

(12) United States Patent
McLaughlin et al.

(10) Patent No.: US 8,665,134 B2
(45) Date of Patent: Mar. 4, 2014

(54) ROTATIONAL PARABOLIC ANTENNA WITH VARIOUS FEED CONFIGURATIONS

(71) Applicant: Detect, Inc., Panama City, FL (US)

(72) Inventors: Scott Andrew McLaughlin, Longmont, CO (US); Megan Maureen Sloan, Longmont, CO (US); Elias Moises Lau, Boulder, CO (US)

(73) Assignee: Detect, Inc., Panama City, FL (US)

( * ) Notice: Subject to any disclaimer, the term of this patent is extended or adjusted under 35 U.S.C. 154(b) by 0 days.

(21) Appl. No.: 13/755,484

(22) Filed: Jan. 31, 2013

(65) Prior Publication Data
US 2013/0141274 A1    Jun. 6, 2013

Related U.S. Application Data

(62) Division of application No. 12/787,643, filed on May 26, 2010, now Pat. No. 8,373,589.

(51) Int. Cl.
*G01S 13/00* (2006.01)
*H01Q 1/00* (2006.01)
*H01Q 19/10* (2006.01)
*H01Q 3/00* (2006.01)
*H01Q 19/12* (2006.01)

(52) U.S. Cl.
USPC ........... 342/26 R; 342/52; 343/720; 343/755; 343/757; 343/834; 343/840

(58) Field of Classification Search
USPC .... 342/26 R, 26 A, 26 B, 26 C, 26 D, 52–58; 343/720, 721, 753–755, 757, 761–766, 343/781 R, 834–840; 367/87–116, 118–130
See application file for complete search history.

(56) References Cited

U.S. PATENT DOCUMENTS

| | | | |
|---|---|---|---|
| 2,322,011 A | | 6/1943 | French |
| 2,759,182 A | * | 8/1956 | Chaffee ..................... 343/838 |
| 2,916,739 A | * | 12/1959 | Falstrom ..................... 343/761 |
| 3,009,152 A | * | 11/1961 | Gregory et al. .............. 343/705 |
| 3,071,770 A | * | 1/1963 | Wilkes ..................... 343/781 R |
| 3,081,048 A | * | 3/1963 | Lapham, Jr. ................ 244/3.11 |
| 3,229,234 A | * | 1/1966 | Lattanzi ..................... 333/261 |
| 3,305,043 A | * | 2/1967 | Pfund et al. .................. 181/128 |
| 3,675,191 A | * | 7/1972 | McAllister ................ 73/170.13 |
| 3,735,333 A | * | 5/1973 | Balser et al. ................. 367/105 |
| 3,889,533 A | * | 6/1975 | Balser ..................... 73/170.13 |
| 3,898,668 A | * | 8/1975 | Evans et al. ................. 343/759 |

(Continued)

OTHER PUBLICATIONS

K. A. Brwoning et al., The Determination of Kinematic Properties of a Wind Field Using Doppler Radar, Journal of Applied Meteorology, Feb. 1968, pp. 105-113, vol. 7 issue 1, American Meteorology Society, US.

(Continued)

*Primary Examiner* — Peter Bythrow
(74) *Attorney, Agent, or Firm* — Paul F. Neils; Edwards Neils PLLC

(57) ABSTRACT

A rotational antenna includes a stationary feed which is disposed in a substantially vertical orientation. A parabolic dish is rotationally mounted about the stationary feed in a state of being tipped with respect to the stationary, substantially vertically oriented feed. The rotational parabolic antenna may alternatively be provided with a rotating radio frequency (RF) and acoustic feed. Other embodiments are disclosed.

21 Claims, 15 Drawing Sheets

(56) References Cited

U.S. PATENT DOCUMENTS

| | | | | |
|---|---|---|---|---|
| 3,912,954 A | * | 10/1975 | Baird | 310/322 |
| 4,206,639 A | * | 6/1980 | Balser | 73/170.16 |
| 4,219,887 A | * | 8/1980 | MacCready, Jr. | 367/90 |
| 4,222,265 A | * | 9/1980 | Ravussin | 374/119 |
| 4,338,608 A | | 7/1982 | Strauch et al. | |
| 4,351,188 A | * | 9/1982 | Fukushima et al. | 73/170.13 |
| 4,652,885 A | * | 3/1987 | Saffold et al. | 343/725 |
| 4,712,108 A | * | 12/1987 | Schwab | 342/26 D |
| 4,755,825 A | * | 7/1988 | Crochet et al. | 343/757 |
| 4,761,650 A | * | 8/1988 | Masuda et al. | 342/26 D |
| 4,831,874 A | * | 5/1989 | Daubin et al. | 73/489 |
| 4,963,878 A | * | 10/1990 | Kildal | 343/781 P |
| 5,122,805 A | * | 6/1992 | Peterman et al. | 342/26 D |
| 5,189,425 A | * | 2/1993 | Dabbs | 342/52 |
| 5,198,827 A | * | 3/1993 | Seaton | 343/761 |
| 5,262,782 A | * | 11/1993 | Rubin et al. | 342/26 D |
| 5,544,525 A | * | 8/1996 | Peterman et al. | 73/170.13 |
| 5,952,979 A | * | 9/1999 | Choi | 343/766 |
| 6,020,859 A | * | 2/2000 | Kildal | 343/781 CA |
| 6,043,788 A | * | 3/2000 | Seavey | 343/781 CA |
| 6,070,461 A | * | 6/2000 | Gjessing et al. | 73/170.15 |
| 6,075,497 A | * | 6/2000 | Chen et al. | 343/840 |
| 6,098,018 A | * | 8/2000 | Welsh et al. | 702/3 |
| 6,111,547 A | * | 8/2000 | Gau et al. | 343/786 |
| 6,747,604 B2 | * | 6/2004 | Amyotte et al. | 343/754 |
| 6,856,273 B1 | * | 2/2005 | Bognar | 342/26 D |
| 6,911,950 B2 | | 6/2005 | Harron | |
| 6,943,745 B2 | * | 9/2005 | Rao et al. | 343/757 |
| 7,317,659 B2 | * | 1/2008 | Martin | 367/89 |
| 7,362,279 B2 | * | 4/2008 | Locatori | 343/786 |
| 7,365,696 B1 | * | 4/2008 | Smeltzer | 343/757 |
| 7,728,782 B2 | * | 6/2010 | Watson et al. | 343/840 |
| 7,835,227 B2 | * | 11/2010 | Martin | 367/87 |
| 8,102,324 B2 | * | 1/2012 | Tuau et al. | 343/781 P |
| 2004/0066344 A1 | * | 4/2004 | Amyotte et al. | 343/757 |
| 2004/0150574 A1 | | 8/2004 | Harron | |
| 2004/0189538 A1 | * | 9/2004 | Rao et al. | 343/757 |
| 2004/0252586 A1 | * | 12/2004 | Martin | 367/89 |
| 2005/0232082 A1 | * | 10/2005 | Martin | 367/129 |
| 2007/0052607 A1 | * | 3/2007 | Dwornik et al. | 343/766 |
| 2007/0152897 A1 | * | 7/2007 | Zimmerman et al. | 343/757 |
| 2008/0204342 A1 | | 8/2008 | Kharadly | |
| 2008/0285387 A1 | * | 11/2008 | Martin | 367/87 |
| 2009/0066598 A1 | | 3/2009 | Malstrom et al. | |
| 2009/0315795 A1 | * | 12/2009 | Blalock | 343/763 |

OTHER PUBLICATIONS

Parabolic Antenna, Wikipedia, the Free Encyclopedia, Las Modified Aug. 20, 2009, http://en.widipedia.org/wiki/Parabolic_antenna.

File: ASR-9 Radar Antenna.jpg, Wikipedia Commons, Jul. 4, 2005, http://commons.wikimedia.org/wiki/File: ASR-9_Radar_Antenna.jpg.

Arecibo Observatory, Wikipedia, the Free Encyclopedia, Last Modified Aug. 17, 2009, http://en.wikipedia.org/wiki/Arecibo_Observatory.

Paul Wade, Parabolic Dish Antennas, The W1GHZ Online Microwave Antenna Book, 1994 and 1998, Chapter 4, http://www.w1ghz.org/antbook/chap4.pdf.

Paul Wade, Offset-Fed Parabolic Dish Antennas, The W1GHZ Online Microwave Antenna Book, 1995 and 1998, Chapter 5, http://www.w1ghz.org/antbook/chap5.pdf.

* cited by examiner

ROTATIONAL PARABOLIC ANTENNA WITH VARIOUS FEED CONFIGURATIONS

CROSS-REFERENCE TO RELATED APPLICATION

This application is a Divisional Application of U.S. application Ser. No. 12/787,643, filed May 26, 2010, which is herein incorporated by reference in its entirety.

FIELD OF THE INVENTION

The present disclosure relates to antenna systems and, more particularly, to a rotational parabolic antenna with various feed configurations. The feed configurations may include a rotational parabolic antenna with a fixed, either prime focus or off-center feed (the latter also called off-set feed), as well as a rotational parabolic antenna with a rotating radio frequency (RF) and acoustic feed.

BACKGROUND OF THE INVENTION

In general, there are various ways to create antenna beams required in, for example, radar wind profiling. One way is to use a micro-strip patch phased array. Another way is to use multiple antennas such as coaxial-collinear elements ("sticks") in a perpendicular array or with three or five panels. Commercial wind profilers have relied primarily on these two methods. However, among other things, these two methods create antenna beams which produce relatively high side-lobe antenna patterns (since it is difficult to amplitude taper these antennas), and have phase-shifters (RF switches used for pointing) such that both methods can be difficult to maintain and debug. Moreover, these two methods tend to have a problem with ground clutter, and also under-sample the atmosphere due to the formation of only 2, 3 or 5 separately pointed beams.

Still further, radio acoustic sounding systems (RASS) are often included with a radar wind profiler and also provide profiles of virtual temperature. Current systems utilize separate acoustic antenna systems to focus and transmit the sound.

SUMMARY OF THE INVENTION

An apparatus consistent with the present disclosure provides a radar wind profiler system and an antenna subsystem.

An apparatus consistent with the present disclosure further provides an antenna subsystem operative for both RF and acoustic use.

According to one aspect, the present disclosure provides a rotational antenna, including: a stationary feed which is disposed in a substantially vertical orientation; and a parabolic dish rotationally mounted about the stationary feed in a state of being tipped with respect to the stationary, substantially vertically oriented feed.

The rotational antenna may include a positioner which rotatably positions the parabolic dish around the stationary feed.

According to another aspect, the parabolic dish is tipped about 10 to 20 degrees with respect to a position wherein the parabolic dish is centered with respect to the stationary feed.

According to another aspect, the stationary feed comprises a radio frequency (RF) feed.

According to another aspect, the stationary feed comprises an acoustic feed.

According to another aspect, the stationary feed comprises a radio frequency (RF) feed and a separate acoustic feed operating together and simultaneously.

According to another aspect, a circle is traced out by beam positions of the antenna, and data is collected at one of four, eight, sixteen, or more, or continuous points at certain altitudes on the circle defined by the antenna as the positioner rotates the antenna to point to new positions.

According to another aspect, the positioner rotates the antenna at least one of continuously or every preset period of time.

According to another aspect, the present disclosure provides a rotational antenna, including: a rotational parabolic dish; and a rotational feed which is disposed on the rotational parabolic dish for rotation therewith, the rotational feed comprising at least one radio frequency (RF) feed and at least one separate acoustic feed.

The rotational antenna may include a positioner which rotatably positions the rotational parabolic dish and the rotational feed.

The positioner may include: a stationary antenna mount; a turntable rotatably mounted to the stationary antenna mount; and a rotator motor which rotates the turntable, wherein the rotational parabolic dish is fixedly mounted to the turntable for rotation therewith.

The stationary, substantially vertically oriented feed may include a stationary feed column, and the parabolic dish is rotatably mounted with respect to the stationary feed column by way of a feed column bearing retainer and stabilizer which maintains the stationary feed column supported within the rotatable parabolic dish.

According to another aspect, the present disclosure provides a velocity-azimuth display (VAD) radar wind profiler system for making automatic measurements of wind profiles in the atmosphere, including: a radar controller for controlling the acquisition of wind profiles; and an antenna subsystem communicatively connected to the radar controller and comprising a rotational antenna, the rotational antenna comprising: a stationary feed which is disposed in a substantially vertical orientation; and a parabolic dish rotationally mounted about the stationary feed in a state of being tipped with respect to the stationary, substantially vertically oriented feed.

The stationary, substantially vertically oriented feed may comprise at least one radio frequency (RF) feed and at least one separate acoustic feed to enable automatic measurements of virtual temperature.

According to another aspect, the present disclosure provides a velocity-azimuth display radar wind profiler system for making automatic measurements of wind profiles in the atmosphere, including: a radar controller for controlling the acquisition of wind profiles; and an antenna subsystem communicatively connected to the radar controller and comprising a rotational antenna, the rotational antenna including: a rotational parabolic dish; and a rotational feed which is disposed on the rotational parabolic dish for rotation therewith, the rotational feed comprising at least one radio frequency (RF) feed and at least one separate acoustic feed to enable automatic measurements of virtual temperature.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE EXEMPLARY EMBODIMENTS

The exemplary embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Note that at times the system of the present disclosure is described as performing a certain function. However, one of ordinary skill in the art would know that the program is what is performing the function rather than the entity of the system itself.

Although aspects of one implementation of the present disclosure are depicted as being stored in memory, one skilled in the art will appreciate that all or part of systems and methods consistent with the present invention may be stored on or read from other non-transitory computer-readable media, such as secondary storage devices, like hard disks, floppy disks, and CD-ROM, or other forms of a read-only memory (ROM) or a random access memory (RAM) either currently known or later developed. Further, although specific components of the system have been described, one skilled in the art will appreciate that a system suitable for use with the methods and systems consistent with the present disclosure may contain additional or different components.

Figure 1:
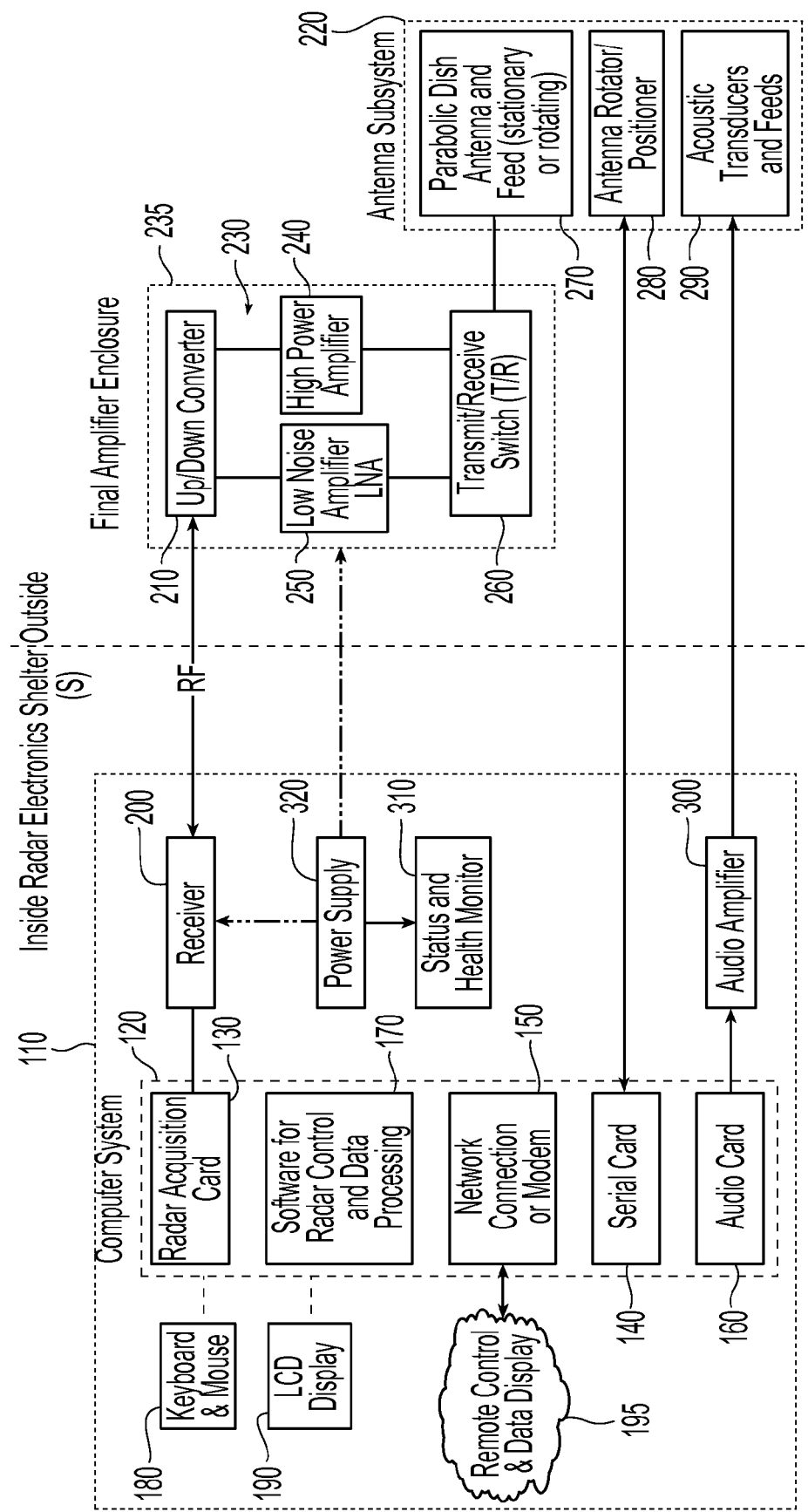
FIG. 1 illustrates a velocity-azimuth display (VAD) radar wind profiler system according to an exemplary embodiment of the present disclosure.

FIG. 1 illustrates a block diagram of a velocity-azimuth display, boundary layer (VAD) radar wind profiler system or radar controller 100 according to an exemplary embodiment of the present disclosure. The VAD radar wind profiler is, for example, a pulse Doppler radar used to make automatic unattended measurements of wind profiles and virtual temperature measurements in the lower atmosphere. It is designed to operate completely unattended with a minimum of maintenance. All data products are produced on site, in real-time, and utilize control software to screen out interference. The VAD radar wind profiler is nominally a 915 MHz radar, although frequencies other than 915 MHz may be used (such as, but not limited to, 915 MHz to 1557 MHz or higher or lower).

With reference to FIG. 1, the VAD radar wind profiler system 100 may comprise the following elements, but is not limited thereto. A computer system 120 is provided, for example, as part of an electronics rack 110. The electronics rack 110 is disposed inside a radar electronics shelter S which may include heating, ventilating and air conditioning equipment (HVAC) (not shown). For example, air conditioning units may be mounted on the roof of the radar electronics shelter S. The computer system or control processor unit (CPU) 120 may include a radar acquisition card 130, a serial card 140, a network connection or modem 150, an audio card 160, and radar control and processing software 170. A keyboard & mouse 180 that may be disposed in a rack mounted drawer (not shown), and a high-resolution liquid crystal display (LCD) 190 are also provided. A remote control and data display 195 may be provided and communicates with the network connection 150.

The radar acquisition card 130 acts as a full digital intermediate frequency receiver. A receiver 200 interfaces between the radar acquisition card 130 and an up/down converter 210. The receiver 200 contains master clock and conditioning hardware to allow the interface and control of the up/down converter 210 and a final amplifier 230. The up/down converter 210 is located outside at an antenna subsystem 220 in an environmentally protected enclosure 235 of the final amplifier 230. The up/down converter 210 converts intermediate frequency to the final transmitted frequency. A high power amplifier 240, a low noise amplifier (LNA) 250, and a transmit/receive switch (T/R) 260 are also located outside at the antenna subsystem 220 in the enclosure 235 of the final amplifier 230 and are connected to the up/down converter 210 and to the antenna subsystem 220. The final amplifier 230 may be solid-state and designed for outdoor use in the environmental enclosure 235. The final amplifier 230 is coupled to the antenna subsystem 220 through the T/R 260, which allows the final amplifier 230 and receiver 200 to be connected to the same antenna without damage to the receiver 200. The final amplifier 230 is a rugged subsystem, specified for application in harsh environments.

The T/R 260 provides protection for the transmitter in case of accidental cutting of the RF cable to the antenna subsystem 220 or other causes of high RF reflection from the antenna subsystem 220.

The antenna subsystem 220 can include, but is not limited to, an antenna 270, an antenna rotator/positioner 280, and acoustic transducers and feeds 290. The antenna 270 may be, for example, a 2 to 3 meter diameter parabolic dish with a shroud and a radome, or other embodiment of a parabolic dish as will be discussed in greater detail below. The positioner 280 may be a motorized elevation and azimuth, or azimuth-only positioner. The positioner 280 communicates with the serial card 140 of the computer system 120. The various cables, such as RF cables, acoustic cables pass through the stationary or rotary feed of the antenna 270, as will be discussed in detail below with respect to the illustrative embodiments. The acoustic transducers and feeds 290 communicate with the audio card 160 through an audio amplifier 300.

A status and health monitor 310 is provided, for example, as a separate subsystem to monitor all voltages, currents, an RF power level, temperatures, cooling fan status and other information for optimum operation of the radar. An electronics power supply 320 powers the monitor 310, all RF subsystems, and the final amplifier 230.

The data products and displays may be generated on site, in real-time, and are available for immediate use and can be tailored as needed (time, height reference for above ground level (AGL) or mean sea level (MSL), time reference for Coordinated Universal Time (UTC) or local time, zoom in time and space, and colors). A graphics-rich environment is provided that may contain numerous displays in addition to standard wind displays, for viewing on, for example, LCD 190. For example, the power reflected from atmospheric turbulence and precipitation for understanding atmospheric conditions may be provided. The meteorological data products may be displayed (e.g., wind speed, wind direction, vertical winds, spectra, final moment data, temperature, etc.) and can be saved to disk.

The VAD radar wind profiler system 100 including the data system are operative to run autonomously, 24 hours a day, 7 days a week. The displays and data products are generated automatically along with continuous health and status monitoring. Data products can also be played-back.

A detailed description of the various embodiments of the antenna subsystem will now be provided in connection with FIGS. 2-15.

Figure 2:
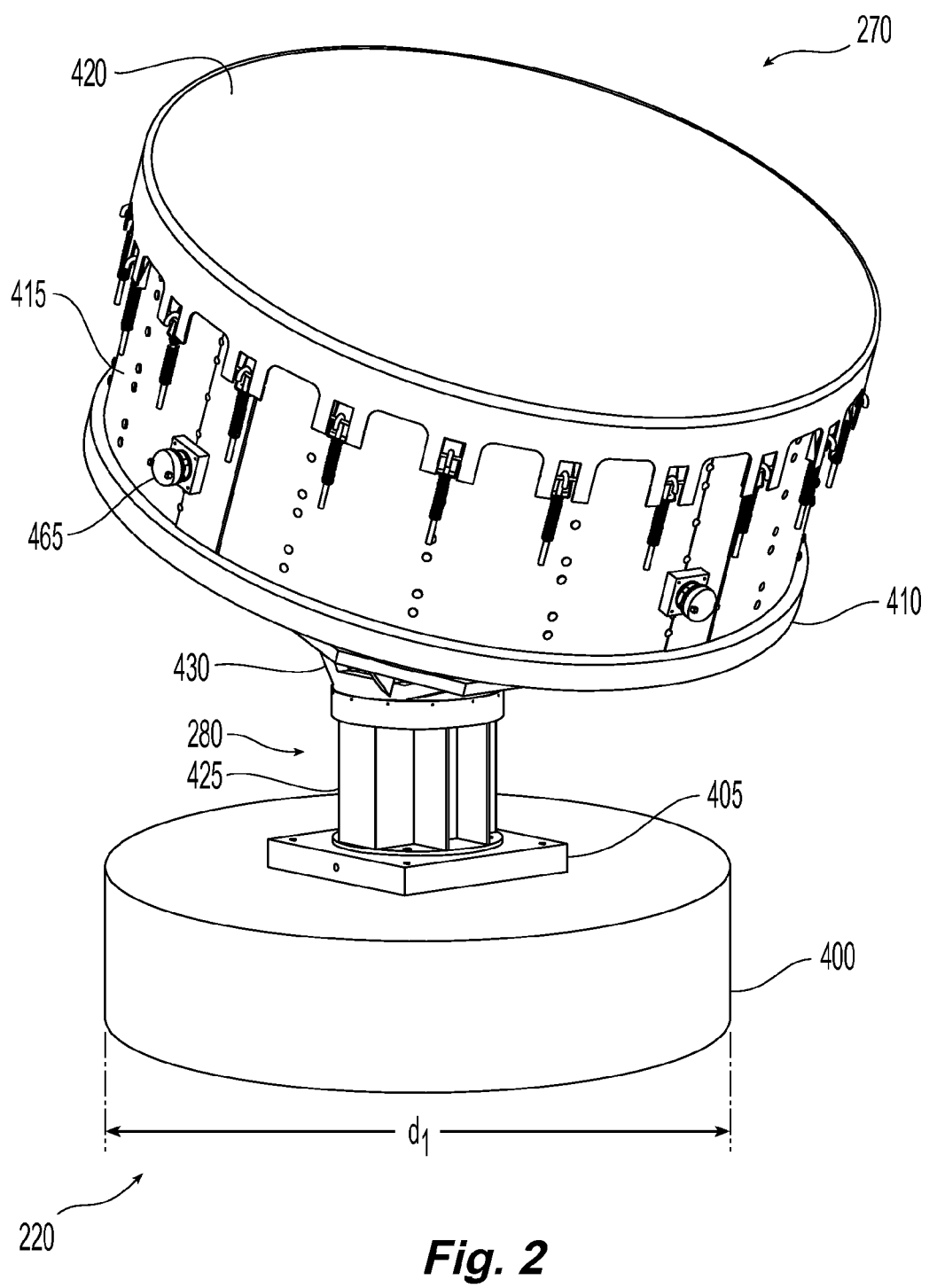
FIG. 2 depicts an illustrative embodiment of a rotational parabolic antenna subsystem with a rotating RF feed and rotating acoustic feed.

With reference to FIG. 2, the VAD antenna subsystem 220 uses a single long-life high performance parabolic dish 410 coupled with, for example, a military-grade azimuth-only rotator or positioner 280. In operation, the antenna 270 is aimed at a constant zenith angle (i.e., angle off vertical) in a range of about 0-30 degrees, and preferably in a range of about 10-20 degrees. For example, in an exemplary embodiment, the antenna is aimed at 10 degrees off vertical, but is not limited to this angle. The antenna 270 is automatically repositioned (horizontal rotation only) for each of the profiles required for a selected scan strategy. For each position, the dish remains stationary while the system acquires data (e.g., 10-30 seconds) and then is repositioned (for example, but not limited to <1 second to rotate to new position) to the next azimuth position. The antenna subsystem 220 can also be configured so that the rotator or positioner 280 rotates the antenna 270 at a constant speed.

Figure 3:
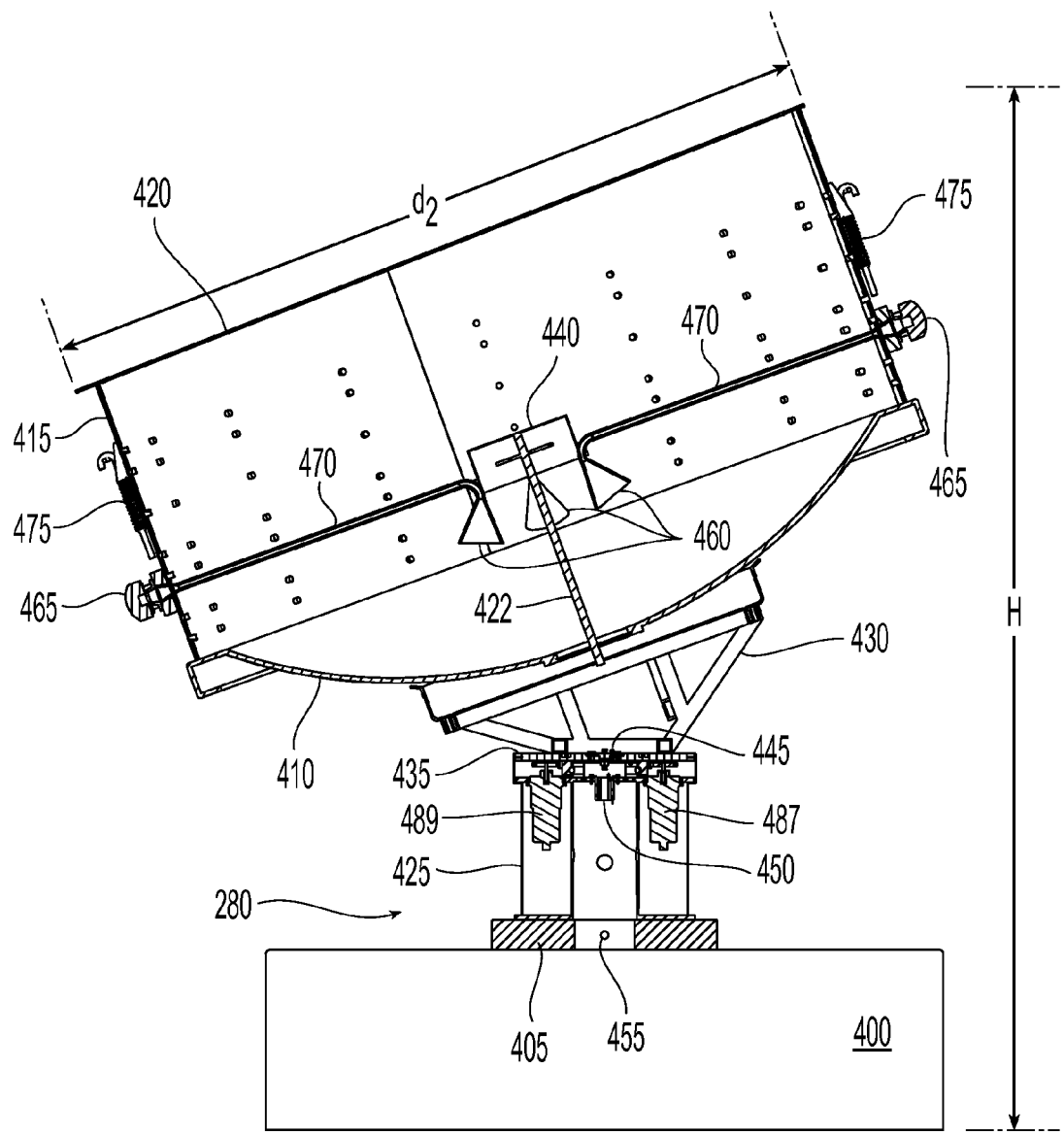
FIG. 3 depicts a cross-sectional view through the antenna of FIG. 2 according to an illustrative embodiment.

In the exemplary embodiment of FIGS. 2-6, the antenna subsystem 220 includes, but is not limited to, a concrete pier or base 400 fixedly set in the ground. The concrete pier 400 may be, for example, 10 feet in diameter ($d_1$). A rotator base 405 is disposed on the concrete base 400. The positioner or rotator 280 is mounted on the rotator base 405. The parabolic dish 410 (which will be explained in more detail below with respect to FIGS. 3-6), a shroud 415 disposed above the parabolic dish 410, and a radome 420 disposed on top of the shroud 415 so as to cover the parabolic dish 410 are rotatably mounted to the stationary antenna mount 425. The radome 420 is a cover made from a material through which radio waves and acoustic energy can pass and which serves to protect the parabolic dish 410 from, for example, the effects of weather. Of course, in alternative embodiments, different radomes can be used, and/or the shroud can be dispensed with. As shown in FIG. 3, in an exemplary embodiment, the nominal dimensions of the antenna 270 are 132 inches (3.35 meters) high (H), and 134 inches (3.40 meters) in diameter ($d_2$). Of course, these are exemplary dimensions and are not meant to be limiting. As will be discussed in more detail below, the parabolic dish 410, the shroud 415 and the radome 420 are rotationally mounted to the stationary antenna mount 425 in a state of being tipped with respect to the stationary antenna mount 425.

FIG. 3 shows a cross-sectional view through the antenna in FIG. 2 according to an illustrative embodiment. In particular, the parabolic dish 410 is mounted on a support frame 430 (or sometimes referred to as a "space frame"), which in turn is mounted on a rotator turntable 435. A rotatable RF feed 440 having a coaxial input 442 is shown extending from the center of the parabolic dish 410. Note that the cable to the antenna is not shown in FIG. 3. As will be discussed in more detail below with respect to the detailed cross-sectional views of FIGS. 6A and 6B, a single channel coaxial rotary joint 480 with bulkhead pass-through opening 445 for electrical device control is disposed on the turntable 435 (again the cables are not shown for ease of understanding). Moreover, a through bore slip ring 450 is provided below the turntable 435 on the stationary antenna mount 425. The rotator 280 may also include an access opening 455 through a side panel or through the rotator base 405.

Figure 4:
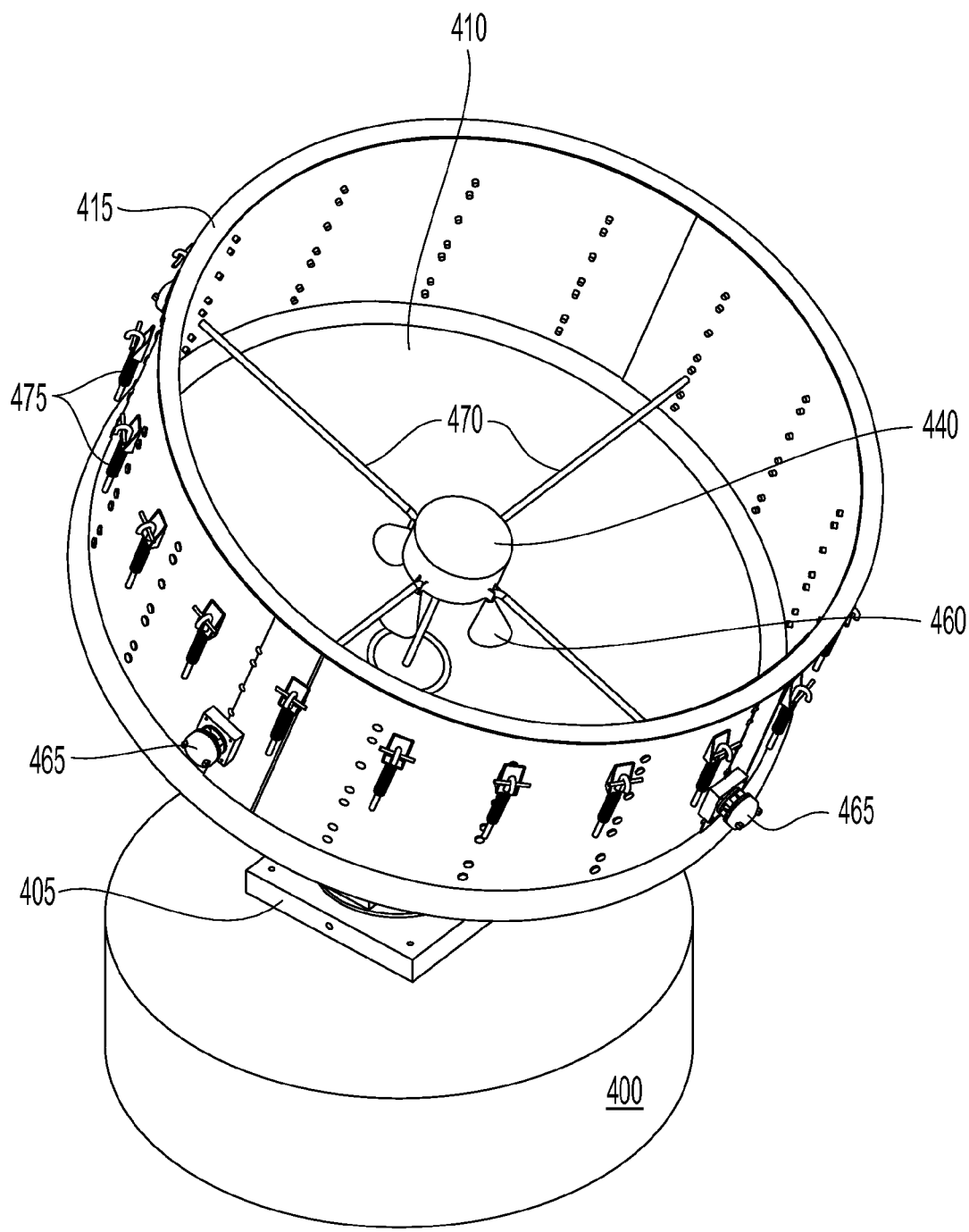
FIG. 4 depicts the embodiment of FIGS. 2 and 3 without the radome wherein the rotating acoustic feed for RASS is shown with the rotating RF feed.
Figure 5:
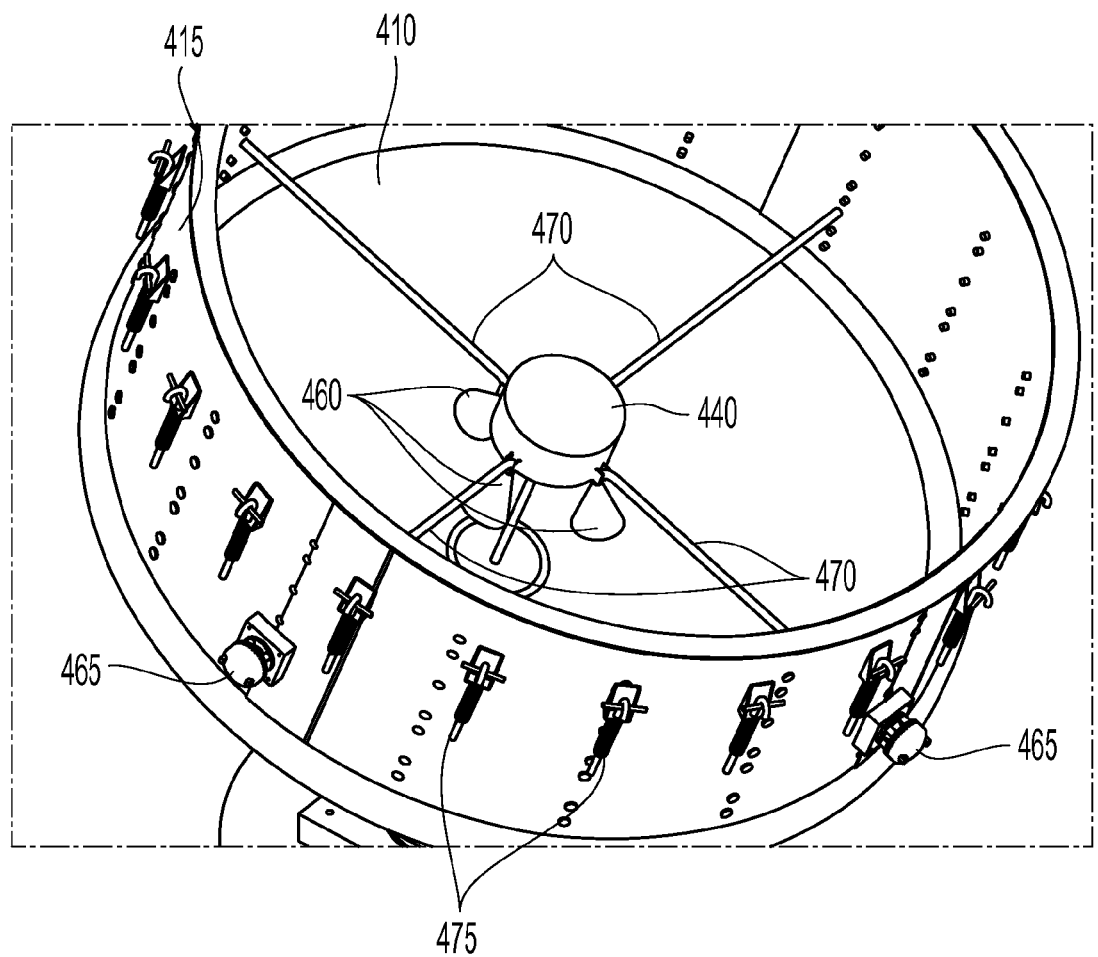
FIG. 5 shows an enlarged perspective view of FIG. 4.

FIGS. 4 and 5 show the embodiment in FIGS. 2 and 3 without the radome 420 for ease of understanding. With reference to FIGS. 3, 4, and 5, a rotating acoustic feed for RASS 460 is included with the rotating RF feed 440. As better shown in the enlarged perspective view of FIG. 5, a plurality of acoustic feeds for RASS 460 is provided on the RF feed 440. Each of the acoustic feeds 460 communicates with an electrical device in the form of an RASS transducer 465 via a corresponding pipe 470 to "carry" the sound. While four acoustic feeds for RASS 460 and four corresponding RASS transducers 465 are shown, the number is not limited to this and could be more or less (for example, three). A plurality of radome 420 tensioners 475 can be positioned around the outer periphery of the shroud 415 for applying the proper tension to the radome 420.

Figure 6A:
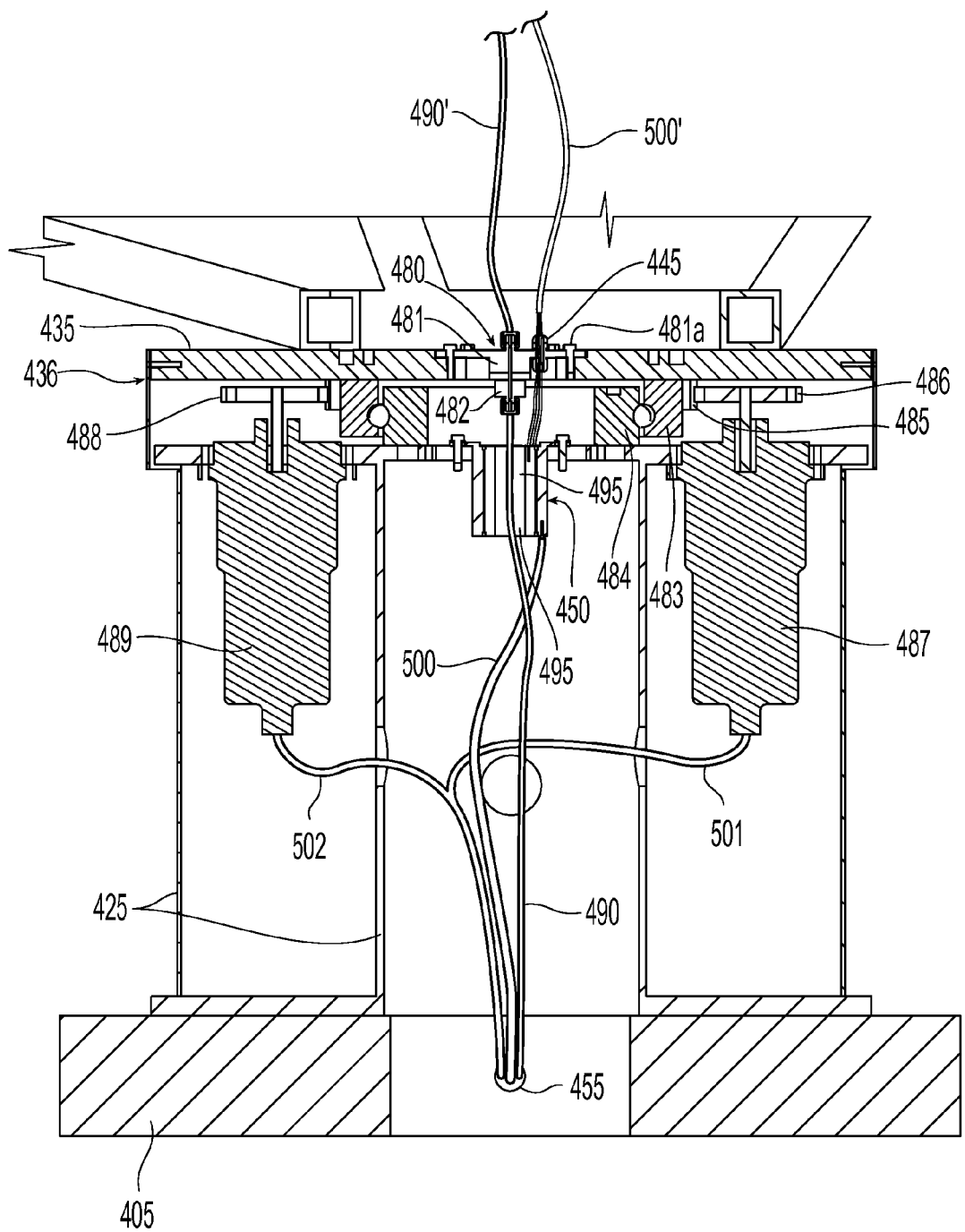
FIGS. 6A and 6B show detailed cross-sectional views of an exemplary embodiment of the rotational mounting of the parabolic dish to the stationary mount of the antenna of FIGS. 2-5.
Figure 6B:
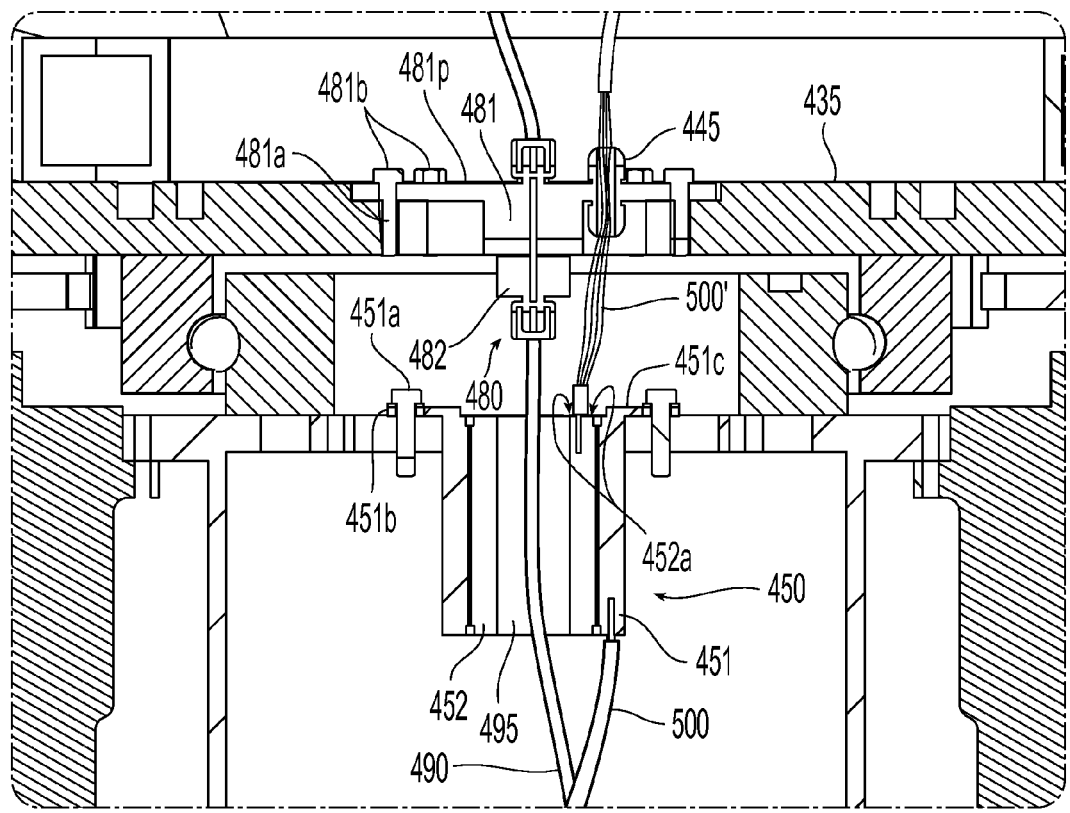

FIGS. 6A and 6B show detailed, enlarged cross-sectional views of an exemplary embodiment of the rotational mounting of the parabolic dish 410 to the stationary antenna mount 425 of the antenna of FIGS. 2-5. More specifically, the rotator turntable 435 comprises an outer bearing race 483 fixedly mounted on the bottom thereof and rotatably mounted on an inner bearing race 484 which in turn is fixed on top of the stationary antenna mount 425. The outer bearing race 483 includes outer circumferential gear 485 which engages with a rotator drive gear 486 of electric rotator motor 487. A rotator position encoder 488 also engages with the outer circumferential gear 485 and is part of a rotator sensor and controller 489. The electric rotator motor 487 and the rotator position encoder 488 are both mounted to the stationary antenna mount 425. The turntable 435 also includes a turntable cover 436 for covering the gap between the turntable 435 and the stationary antenna mount 425.

A coaxial rotary joint 480 is positioned at the center of the rotatable turntable 435. The rotary joint 480 includes a top portion 481, which includes plate or disc-shaped portion 481p, which rotates and a bottom central portion 482 which is stationary. The coaxial rotary joint 480 comprises the high performance slip ring 450. In the body of the rotary joint 480, there is a bearing for alignment and a spring loaded conductor (not shown) that is designed such that it constantly contacts a metal plate or ring when the other portion is rotating. U.S. Pat. No. 3,229,234, issued on Jan. 11, 1966, discloses an example of a suitable coaxial rotary joint per se and is incorporated herein by reference in its entirety. The disc-shaped portion 481p of the top portion 481 of the coaxial rotary joint 480 has a plurality of mounting holes 481a for receiving suitable fasteners, such as bolts 481b, for fixing the disc-shaped portion 481p to the turntable 435. The disc-shaped portion 481p further includes the bulkhead pass-through opening 445 for accommodating wires 500' (e.g., a twisted pair) for electrical device control (e.g., RASS transducers 465 positioned around the periphery of the shroud 415) and which extend down to the slip ring 450 below.

The slip ring 450 comprises an external cylinder 451 which is fixed to the stationary antenna mount 425 by fasteners such as bolts 451a that pass through openings 451b in a flange 451c disposed at the top of the external cylinder 451. The slip ring 450 further comprises an internal cylinder 452 which is rotatably mounted within the external cylinder 451. The wires 500' that extend down through the bulkhead pass-through opening 445 are connected to a top portion 452a of the internal cylinder 452 and rotate therewith when the turntable 435 is rotated to position the parabolic dish 410. The internal cylinder includes the opening 495 for allowing the coaxial cable 490 to pass therethrough. U.S. Pat. No. 2,322,011, issued on Jun. 15, 1943, discloses an example of a suitable slip ring structure per se and is incorporated herein by reference in its entirety. Preferably, but not necessarily, the through bore slip ring 450 includes, for example, 2, 4, 8 or more contacts.

The stationary bottom central part 482 of the rotary joint is connected to the rigid coaxial cable 490 for the RF feed 440 which feeds through the opening 495 in the internal cylinder 452 of slip ring 450. The lower part of the coaxial cable 490 for the RF feed 440 passes down through the access opening 455 in the rotator base 405. The upper part of the cable 490' extends from the rotating top portion 481 up to the RF feed 440 which also rotates with the parabolic dish 410. Feed wires (e.g., a twisted pair) 500 for the RASS transducers 465 pass through the access opening 455 and up to the through bore slip ring 450 where the wires 500 connect to the bottom of the stationary external cylinder 451. The electrical wires 501 from the electric rotator motor 487 and electrical wires 502 from the rotator sensor and controller 489 also pass through the access opening 455.

Figure 7:
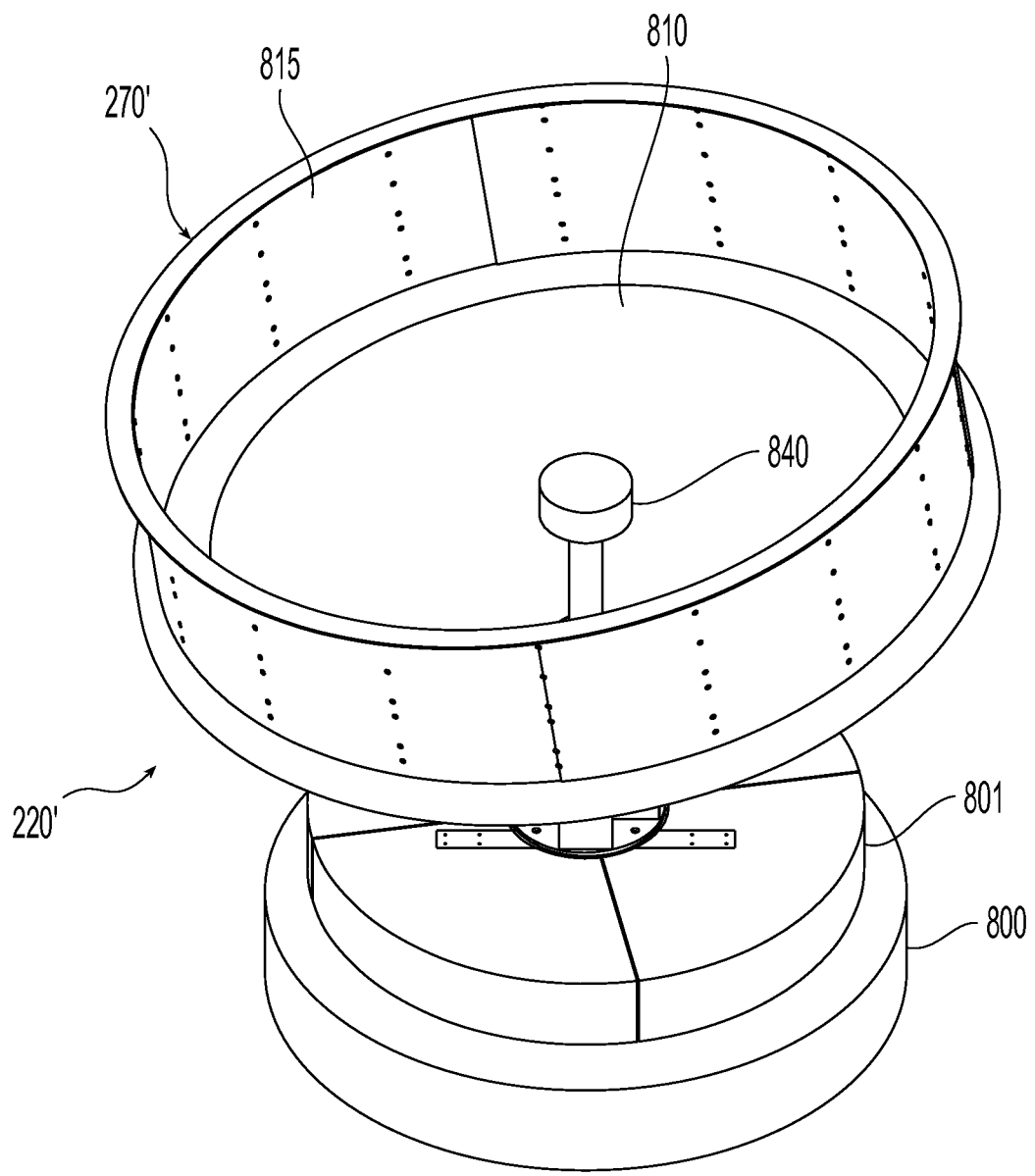
FIG. 7 depicts a further illustrative embodiment of a rotational parabolic antenna subsystem with a fixed, off-center RF feed.
Figure 8:
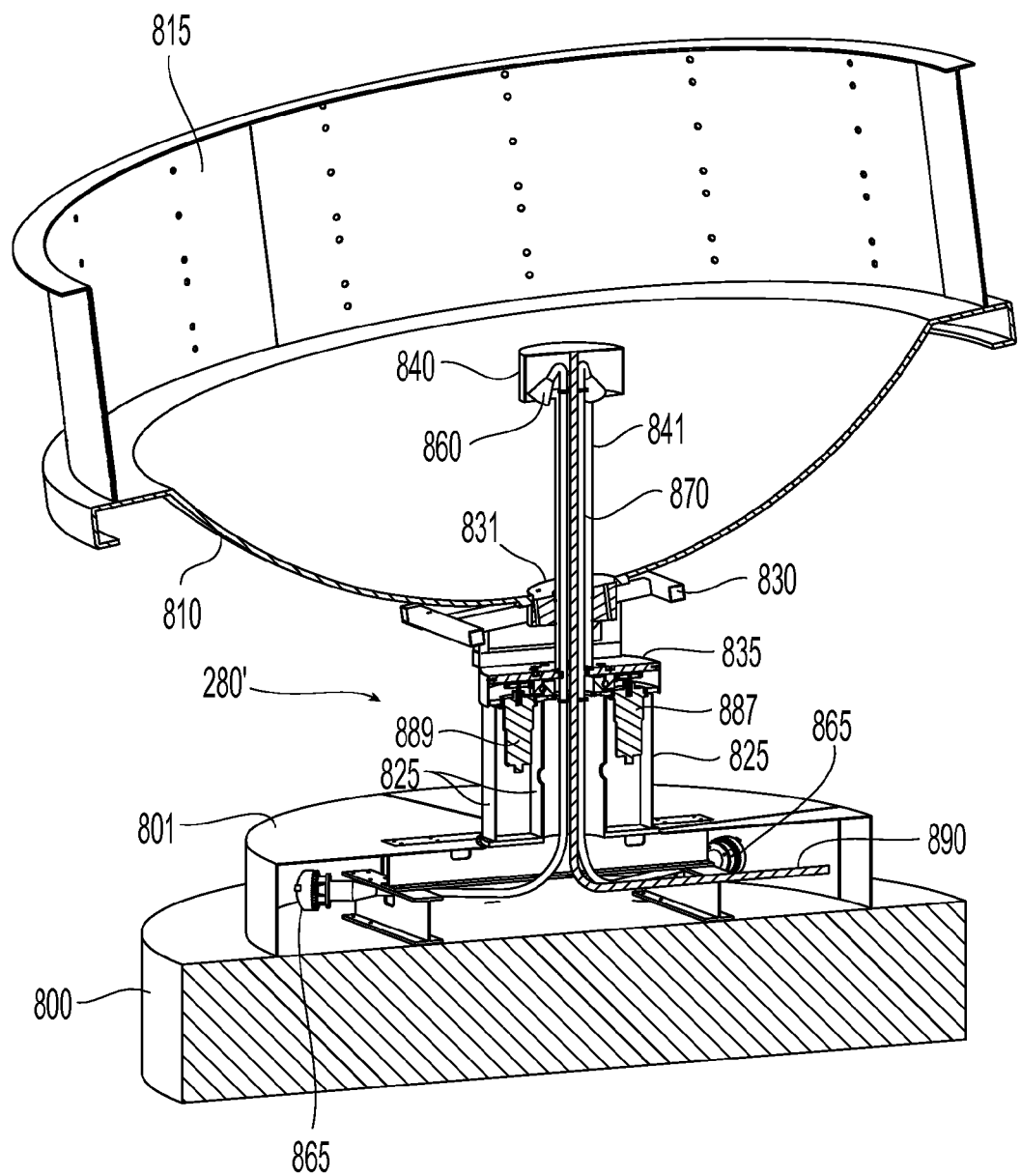
FIG. 8 depicts a sectional view of the embodiment of FIG. 7 showing the details of the stationary RF feed as well as the antenna rotator.

FIGS. 7-12 show the antenna subsystem 220' including the parabolic antenna dish mounted on a stationary feed such that the dish rotates around the feed according to another illustrative embodiment. As shown in FIGS. 7 and 8, the stationary feed comprises at least one radio frequency (RF) feed. Moreover, as shown in FIGS. 9-12, at least one separate acoustic feed can be included, as will be discussed in detail below.

FIG. 7 shows a further illustrative embodiment of the rotational parabolic antenna subsystem having a fixed, off center feed. In this further embodiment, like elements are denoted with like reference numerals except with a prime sign (') or with the prefix "8" instead of "4" as with the embodiment of FIGS. 2-6. Accordingly, the parabolic antenna 270' includes a radome (same as shown in FIG. 2), a shroud 815, a parabolic dish 810, a support frame/"space frame" 830, a rotator 280', and a base 800 for the rotator 280'. In particular, FIG. 7 is a perspective view showing the stationary RF feed 840 positioned within the parabolic dish 810 and surrounded by the shroud 815. Also shown in FIG. 7 is the concrete base 800 for mounting the stationary mount 825 of the antenna. A cover 801 for covering various electrical equipment is provided on the concrete base 800.

FIG. 8 depicts a sectional view of the further embodiment of FIG. 7 showing the details of the stationary RF feed 840 positioned within the parabolic dish 810 and surrounded by the shroud 815, as well as the rotator 280'. As can be seen in FIG. 8, the stationary RF feed 840 projects substantially vertically upwardly from the stationary mount 825 such that the parabolic dish 810, space frame 830, and the turntable 835 rotate around the stationary RF feed 840.

FIGS. 9 through 12 show further detailed views of the further embodiment of FIGS. 7 and 8 as will be discussed in detail below. Certain portions are sometimes removed for ease of understanding.

With reference to FIGS. 9-12, the stationary RF feed 840 includes an RF and RASS feed column 841. The coaxial cable 890 of the RF feed 840 and the acoustic feeds 860 pass up through the RF and RASS feed column 841. In particular, the plurality of pipes 870 for carrying sound extend from the acoustic transducers 865, which are located near the base 800, up through the RF and RASS feed column 841 ending at the plurality of acoustic feed horns 860 located proximate to the RF feed 840 (see especially FIG. 10). While the acoustic transducers 865 are shown positioned at the base 800, they may be positioned higher on the stationary antenna mount 825.

Figure 9:
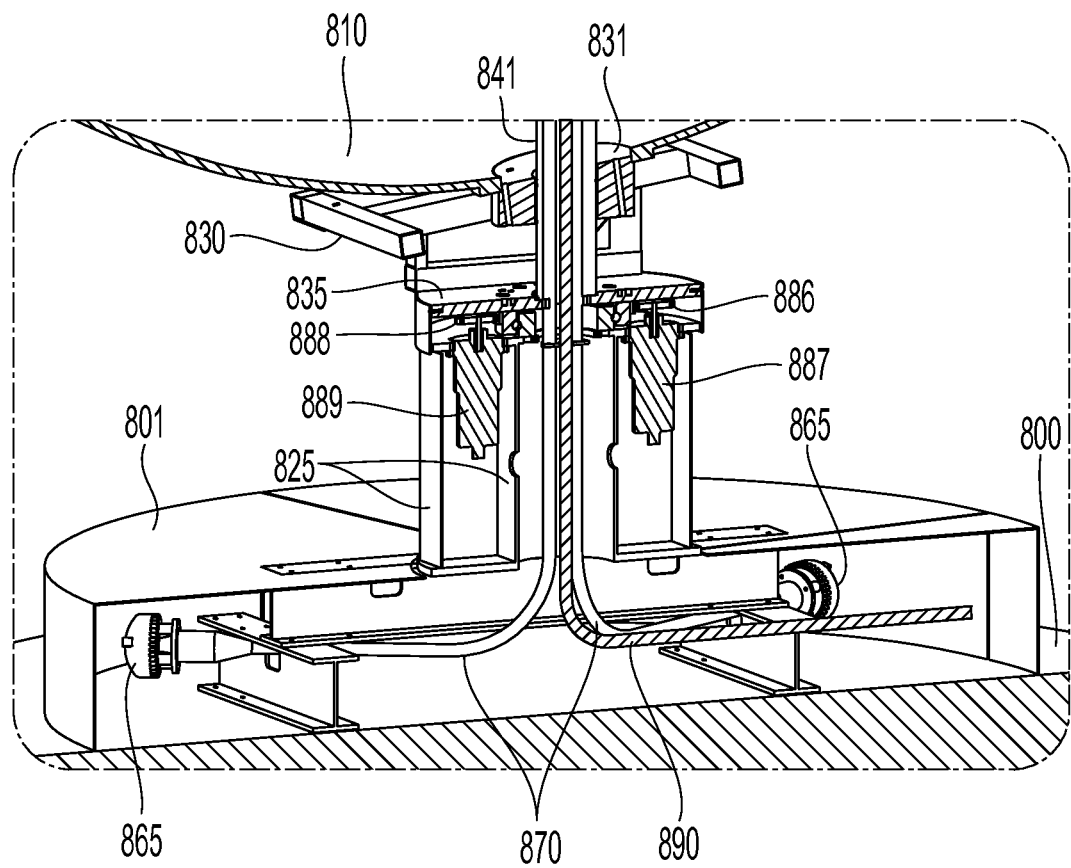
FIGS. 9-12 show addition detailed views of the further embodiment of FIGS. 7 and 8.
Figure 10:
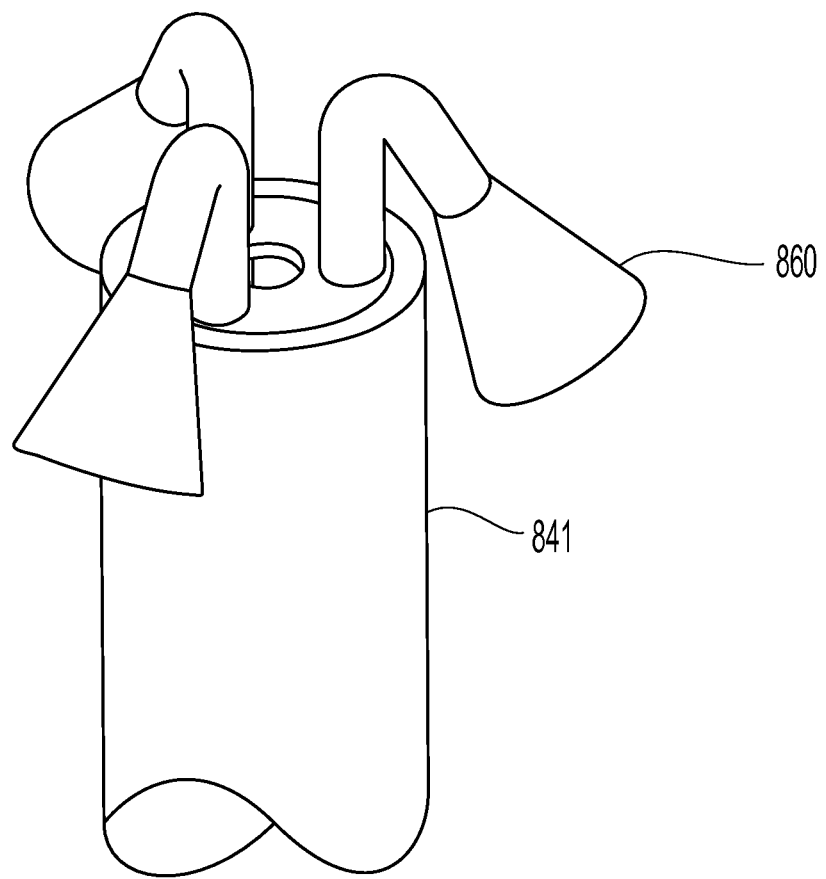
Figure 11:
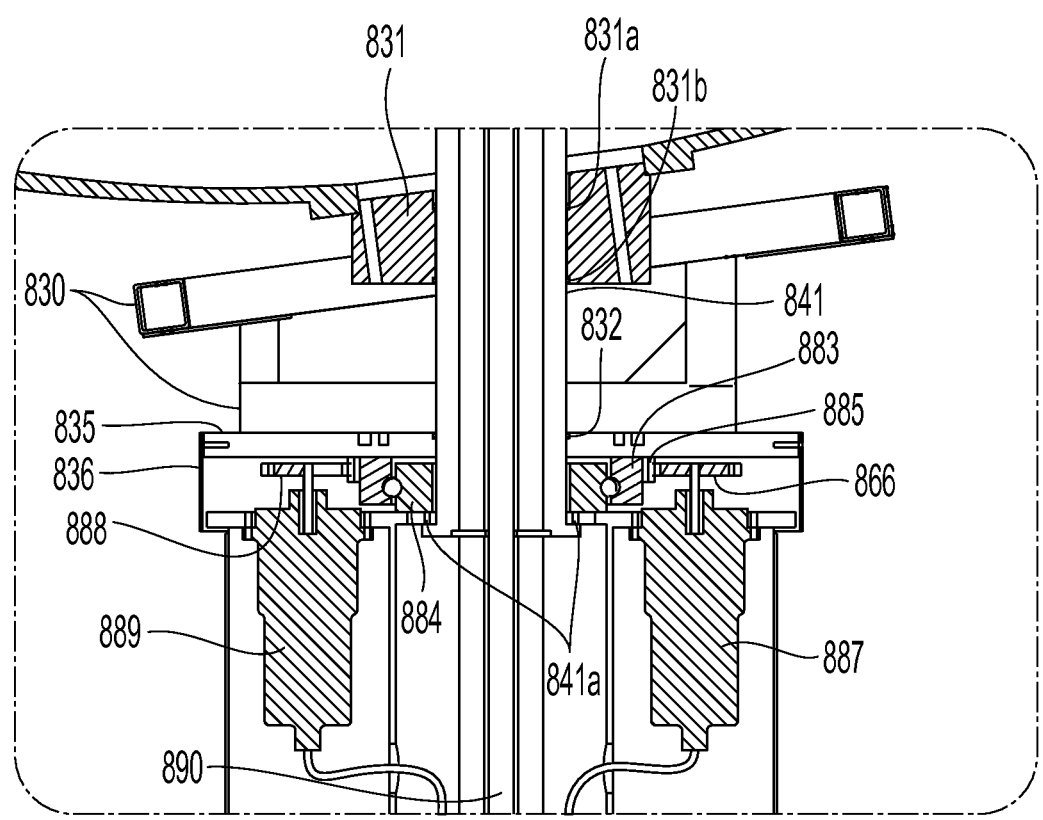
Figure 12:
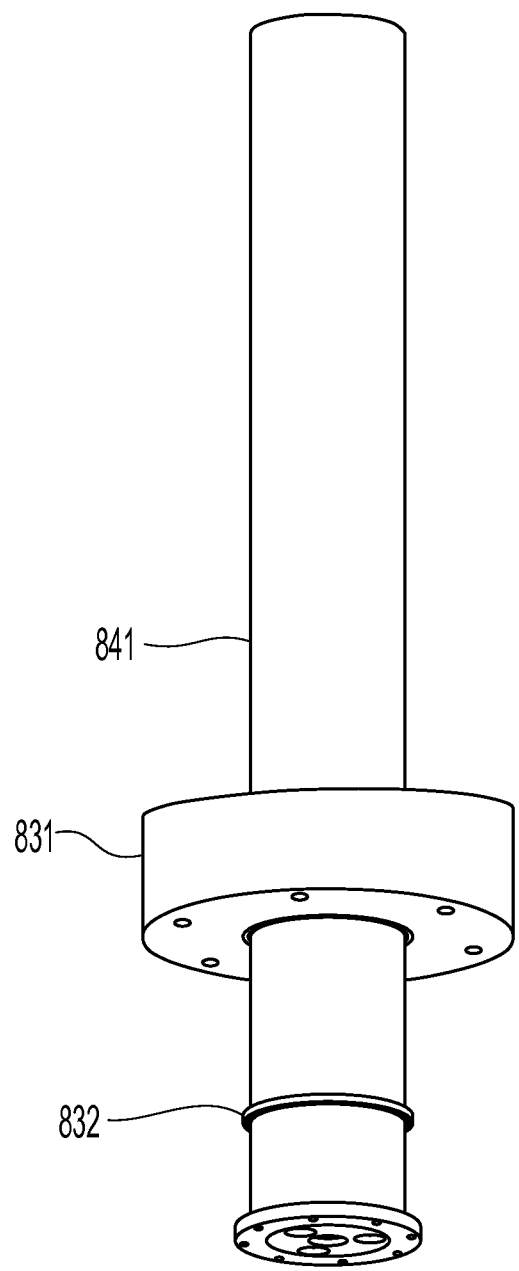

FIGS. 9, 11 and 12 show detailed views of the rotational mounting of the parabolic dish 810 and space frame 830 to the stationary feed column 841. In particular, the parabolic dish 810 is rotatably mounted by way of a feed column bearing retainer and stabilizer 831, which maintains the feed column 841 supported within the rotatable parabolic dish 810. The feed column bearing retainer and stabilizer 831 includes large diameter bearings 831a and 831b. The space frame 830 is fixedly mounted to the bottom of the parabolic dish 810 and to the top of the rotatable turntable 835 which in turn is rotatably mounted to the stationary antenna mount 825 by way of bearings races 883 and 884 similar to the embodiment of FIGS. 2-6. A bearing 832 is disposed between the stationary feed column 841 and the turntable 835 and provides an interface between the stationary feed column 841 and turntable 835. The bottom of the stationary feed column 841 is mounted to the stationary antenna mount 825 by suitable fasteners 841a.

The outer bearing race 883 includes outer circumferential gear 885 which engages with a rotator drive gear 886 of electric rotator motor 887. A rotator position encoder 888 also engages with the outer circumferential gear 885 and is part of a rotator sensor and controller 889. The electric rotator motor 887 and the rotator position encoder 888 are both mounted to the stationary antenna mount 825. The turntable 835 also includes a turntable cover 836 for covering the gap between the turntable 835 and the stationary antenna mount 825.

Figure 13:
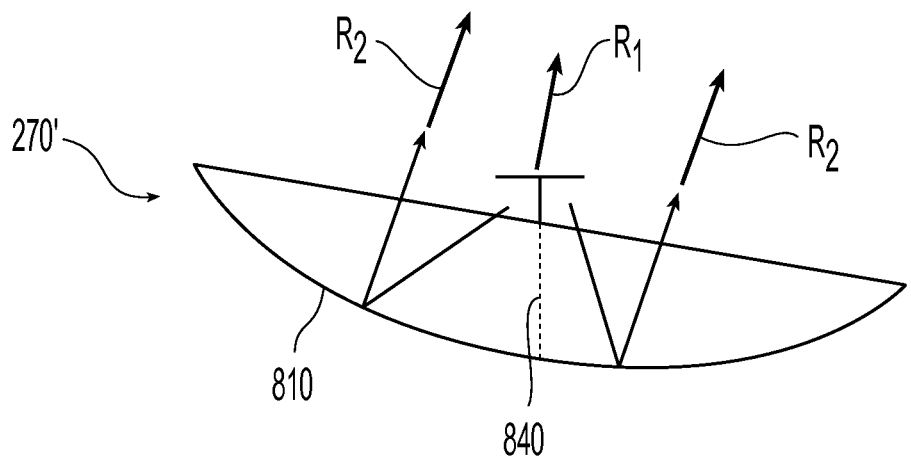
FIG. 13 is a schematic drawing of the rotational parabolic antenna dish mounted on the fixed, off-center RF feed according to the illustrative embodiment of FIG. 7.
Figure 14:
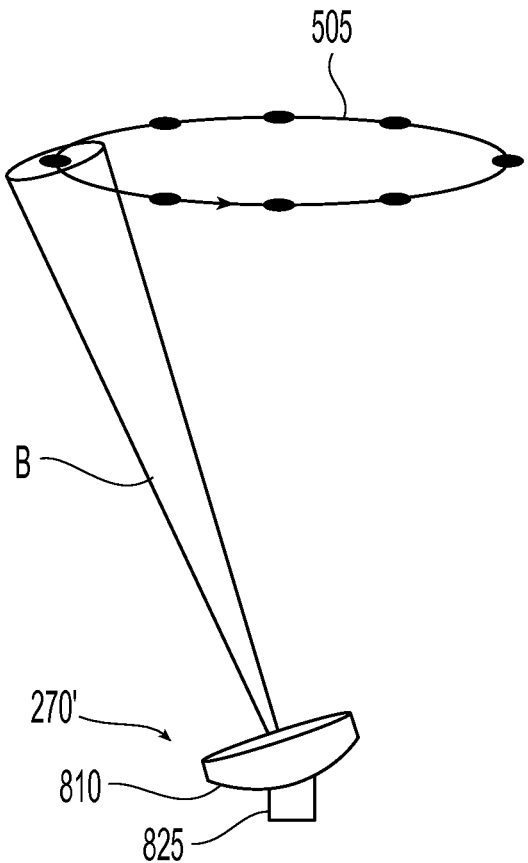
FIG. 14 is a schematic drawing showing the circle traced out by the antenna according to an illustrative embodiment.
Figure 15:
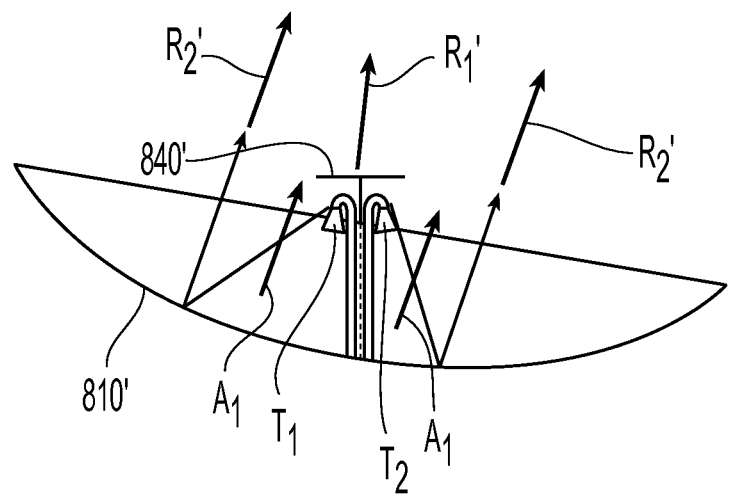
FIG. 15 is a schematic drawing of the rotational parabolic antenna dish mounted on the fixed, off-center RF and acoustic feeds according to the illustrative embodiment of FIGS. 9-12.

FIGS. 13-15 are explanatory schematic drawings for describing the operation of the rotational parabolic antenna dish consistent with the present disclosure.

FIG. 13 is an explanatory schematic drawing of the rotational parabolic antenna dish 810 mounted on the fixed, off-center RF feed 840 according to the illustrative embodiment of FIGS. 7 and 8. As shown, the dish is tipped, for example, 10 degrees from the normal feed position. The main beam then actually points at 20 degrees. In FIG. 13, the arrow R1 is where the dish could point if the dish 810 and feed 840 were both tipped, and the arrows R2 indicate where the dish will actually point. Consistent with the present disclosure, the parabolic dish 810 of the antenna 270' is then rotated 360 degrees around the feed 840, with the feed 840 completely static or stationary. The stationary feed 840 is disposed in a substantially vertical orientation. Moreover, the parabolic dish 810 points upward rather than horizontal. Again, the tip angle is not limited to 10 degrees, and may be in a range of, for example, 5-30 degrees in the fixed feed embodiment.

FIG. 14 is an explanatory schematic drawing showing the circle traced out by the antenna 270' according to the illustrative embodiments. As shown in FIG. 14, a circle 505 is traced out by beam B positions of the antenna 270' during 360 degree rotation of the parabolic dish 810 about the azimuth position, and data is collected, for example, at one of four, eight or sixteen points (8 points are shown as an example, but more or less points could be used) on the circle 505 by the antenna 270' as the positioner 280' rotates the antenna 270' to point to new positions every preset period of time. The preset period of time may be every 10 to 60 seconds, or preferably, but not necessarily, every 10 to 30 seconds.

FIG. 15 is a schematic drawing of the rotational parabolic antenna dish mounted on a fixed, off-center feed according to the embodiment of FIGS. 9-12. As shown in FIG. 15, like elements are denoted by like reference numerals, except that a prime sign (') is included. In this embodiment, the additional acoustic feeds are added for sound (a single acoustic feed could also be used). The sound is broadcast at a particular range of frequencies, and the radar can then track it and actually measure the speed of sound. As noted above, when added to a radar wind profiler, this is called Radio Acoustic Sounding System (RASS). Normally for RASS, separate plastic or fiberglass antennas and cuffs are added. This increases the system cost and requires more maintenance. By feeding the acoustic energy through plastic pipes ("trumpets" or "horns") T1 and T2 to the RF feed 840', then broadcasting it onto the dish, the present invention can use the parabolic dish 810' for both RF and acoustic pointing. As shown in FIG. 15, the RASS horns T1 and T2 are added to the RF feed and point the sound energy shown by A1 in the same direction as the RF/microwave energy R2'. Again, the feeds are static with the dish rotating around the feeds.

In operation, the positioner 280, 280' of the antenna 270, 270' gently rotates to each of, for example, 4, 8, 16, or more positions (virtually in the same physical space since the antenna is only slightly pointed off of true vertical). The antenna 270, 270' and stationary antenna mount 400, 800 can withstand extreme weather including high winds, rain, salt air environments and icing.

Moreover, when used in radar wind profiling, the off-vertical pointing consistent with the present disclosure allows the measurement of all three vectors of the wind (for example: vertical wind is calculated from adding radial velocities in opposite directions. Depending on the radial velocity sign convention, a negative sign has to be included in the final calculation, as well as the zenith angle. Horizontal wind components are calculated as a function of the difference of radial velocities in opposite directions).

The benefits of the antenna consistent with the present disclosure include, but are not limited to, the following:

Much simpler, with less maintenance, uses less power, and much easier to debug
Essentially eliminates antenna failures typical of other system designs
More beams than a 5 beam system but much less physical space and cost
Requires less physical area so more flexible siting
Fewer spares and lower cost for parts depot
Simpler training
4 azimuth angles can be tailored to local environment to avoid specific ground clutter
Allows 4, 8, 16 or more beam positions, producing higher quality data, and better measurements due to more sampling positions and ability to avoid ground clutter
Utilizes VAD signal processing with the many benefits to this kind of pointing which previously only was available with weather radars and lidar systems
By using multiple opposing beams, a better measurement of vertical velocity can be made, since the vertical beam on a normal 3-beam windprofiler is typically contaminated by ground clutter.

Figure 16:
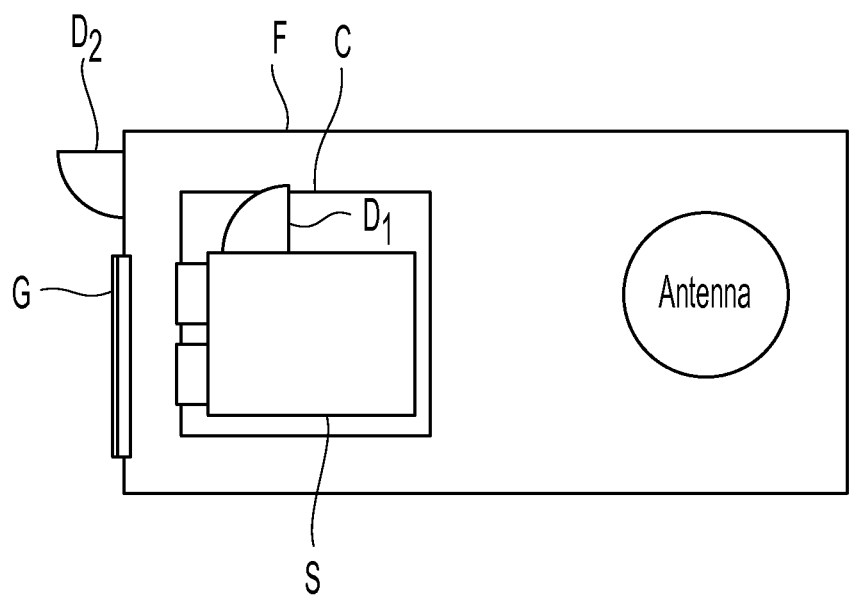
FIG. 16 illustrates an illustrative embodiment of a site layout for the VAD radar wind profiler system.

FIG. 16 shows an illustrative embodiment of a site layout for the VAD radar wind profiler system 100. As shown, the radar electronics shelter S is disposed on, for example, a concrete pad or pier C, and includes a maintenance access door D1. The antenna is positioned a preset distance, such as but not limited to, 10 feet (3 meters) from the radar electronics shelter S. The site is enclosed by a security fence F which includes a vehicle gate G and a site access door D2.

The VAD radar wind profiler consistent with the present disclosure is thus operative to provide unattended real-time operational support for, for example, weather forecasting, aviation operations and other mission critical applications requiring high-quality meteorological data products at high temporal resolution. The VAD radar wind profiler may include advanced signal processing, a wide range of data and maintenance displays, data acquisition cards, and modular hardware designed for ease of maintenance. A user-friendly, graphics-rich user interface provides straightforward radar control, hardware status monitoring, control of advanced signal processing, and displays for both meteorological data products and wind profiler data products.

The present invention has substantial opportunity for variation without departing from the spirit or scope of the present invention. For example, while the embodiments discussed herein are directed to a VAD radar wind profiler system 100 disposed on the ground, such as on concrete pads, the present invention is not limited thereto. For example, the VAD radar wind profiler may be mounted on a trailer for portability.

Those skilled in the art will recognize improvements and modifications to the exemplary embodiments of the present invention. All such improvements and modifications are considered within the scope of the concepts disclosed herein and the claims that follow.

What is claimed is:

1. A rotational antenna, comprising:
   a rotational parabolic dish; and
   a rotational feed which is disposed on the rotational parabolic dish for rotation therewith, the rotational feed comprising at least one rotating radio frequency (RF) feed and at least one separate rotating acoustic feed which is provided on the at least one rotating RF feed,
   wherein the at least one rotating RF feed includes a coaxial input which extends from the center of the rotational parabolic dish,
   wherein the at least one separate rotating acoustic feed comprises at least one pipe with a horn for broadcasting acoustic energy onto the parabolic dish, and
   wherein an end of the at least one pipe having the horn is mounted to the at least one rotating RF feed and the at least one pipe extends radially outwardly from the at least one rotating RF feed such that an opposite end of the at least one pipe is connected with an electrical device.

2. The rotational antenna of claim 1, wherein the at least one separate rotating acoustic feed comprises a plurality of pipes with horns for broadcasting acoustic energy onto the parabolic dish.

3. The rotational antenna of claim 2, wherein the plurality of pipes with horns and respective electrical devices comprise a Radio Acoustic Sounding System (RASS).

4. The rotational antenna of claim 1, comprising a positioner which rotatably positions the parabolic dish and the rotational feed.

5. The rotational antenna of claim 4, wherein the positioner comprises:
   a stationary antenna mount;
   a turntable rotatably mounted to the stationary antenna mount; and
   a rotator motor which rotates the turntable,
   wherein the rotational parabolic dish is fixedly mounted to the turntable for rotation therewith.

6. The rotational antenna of claim 5, comprising a coaxial rotary joint positioned at a center of the turntable for accommodating the coaxial input of the at least one rotating RF feed.

7. The rotational antenna of claim 6, wherein the coaxial rotary joint comprises a bulkhead pass-through opening for accommodating wires for the at least one separate rotating acoustic feed.

8. A velocity-azimuth display (VAD) radar wind profiler system for making automatic measurements of wind profiles in the atmosphere, comprising:
   a radar controller for controlling the acquisition of wind profiles; and
   an antenna subsystem communicatively connected to the radar controller and comprising a rotational antenna, the rotational antenna comprising:
      a rotational parabolic dish; and
      a rotational feed which is disposed on the rotational parabolic dish for rotation therewith, the rotational feed comprising at least one rotating radio frequency (RF) feed and at least one separate rotating acoustic feed which is provided on the at least one rotating RF feed,
   wherein the at least one rotating feed includes a coaxial input which extends from the center of the rotational parabolic dish,
   wherein the at least one separate rotating acoustic feed comprises at least one pipe with a horn for broadcasting acoustic energy onto the parabolic dish, and
   wherein an end of the at least one pipe having the horn is mounted to the at least one rotating RF feed and the at least one pipe extends radially outwardly from the at least one rotating RF feed such that an opposite end of the at least one pipe is connected with an electrical device.

9. The VAD radar wind profiler system of claim 8, wherein the at least one separate rotating acoustic feed comprises a plurality of pipes with horns for broadcasting acoustic energy onto the parabolic dish.

10. The VAD radar wind profiler system of claim 9, wherein the plurality of pipes with horns and respective electrical devices comprise a Radio Acoustic Sounding System (RASS).

11. The VAD radar wind profiler system of claim 8, comprising a positioner which rotatably positions the parabolic dish and the rotational feed.

12. The VAD radar wind profiler system of claim 11, wherein the positioner comprises:
   a stationary antenna mount;
   a turntable rotatably mounted to the stationary antenna mount; and
   a rotator motor which rotates the turntable,
   wherein the rotational parabolic dish is fixedly mounted to the turntable for rotation therewith.

13. The VAD radar wind profiler system of claim 12, comprising a coaxial rotary joint positioned at a center of the turntable for accommodating the coaxial input of the at least one rotating RF feed.

14. The VAD radar wind profiler system of claim 13, wherein the coaxial rotary joint comprises a bulkhead pass-through opening for accommodating wires for the at least one separate rotating acoustic feed.

15. The VAD radar wind profiler system of claim 8, wherein the radar controller comprises a radar acquisition card which acts as a digital intermediate frequency receiver; a receiver; and an up/down converter, wherein the receiver interfaces between the radar acquisition card and the up/down converter.

16. The VAD radar wind profiler system of claim 11, wherein a circle is traced out by beam positions of the antenna, and data is collected at one of four, eight, sixteen, or more points on the circle defined by the antenna as the positioner rotates the antenna to point to new positions.

17. The VAD radar wind profiler system of claim 11, wherein the positioner rotates the antenna at least one of continuously or every preset period of time.

18. The rotational antenna of claim 1, further comprising a shroud disposed above and mounted to the rotational parabolic dish, wherein the electrical device is mounted on the shroud.

19. The rotational antenna of claim 1, wherein the electrical device comprises a Radio Acoustic Sounding System (RASS) transducer.

20. The VAD radar wind profiler system of claim 8, further comprising a shroud disposed above and mounted to the rotational parabolic dish, wherein the electrical device is mounted on the shroud.

21. A rotational antenna, comprising:
   a rotational parabolic dish; and
   a rotational feed which is disposed on the rotational parabolic dish for rotation therewith, the rotational feed comprising at least one rotating radio frequency (RF) feed and at least one separate rotating acoustic feed which is provided directly on the at least one rotating RF feed.

* * * * *